United States Patent [19]

Crouzet

[11] Patent Number: 4,931,193

[45] Date of Patent: Jun. 5, 1990

[54] TREATMENT OF CATALYST PARTICLES

[75] Inventor: Pierre Crouzet, Martigues, France

[73] Assignee: BP Chemicals Limited, London, United Kingdom

[21] Appl. No.: 274,304

[22] Filed: Nov. 18, 1988

Related U.S. Application Data

[62] Division of Ser. No. 71,638, Jul. 9, 1987, Pat. No. 4,818,417, which is a division of Ser. No. 2,162, Jan. 12, 1987, Pat. No. 4,714,553.

[30] Foreign Application Priority Data

Jan. 12, 1987 [FR] France .................................. 86 00724

[51] Int. Cl.$^5$ ...................... E01D 17/00; E01D 45/02
[52] U.S. Cl. .................................... 210/768; 210/772; 210/803; 210/804; 210/806
[58] Field of Search .............. 526/142, 140, 141, 159, 526/351, 348; 525/247; 252/429 B; 423/492; 210/767, 768, 770, 772, 773, 800, 803–805, 808

[56] References Cited

U.S. PATENT DOCUMENTS

| | | | |
|---|---|---|---|
| 3,925,338 | 12/1975 | Ort | 260/88.2 |
| 3,931,134 | 1/1976 | Hartmann et al. | |
| 3,990,996 | 11/1976 | Sandor Oak et al. | |
| 4,098,979 | 7/1978 | Maemoto et al. | 526/100 |
| 4,111,835 | 9/1978 | Foechini et al. | 252/429 |
| 4,329,440 | 5/1982 | Kokubo et al. | 526/142 |
| 4,354,959 | 10/1982 | Epstein | |
| 4,399,054 | 8/1983 | Ferravis et al. | 252/429 B |

FOREIGN PATENT DOCUMENTS

| | | |
|---|---|---|
| 099774 | 6/1983 | European Pat. Off. |
| 1179079 | 5/1959 | France . |
| 1514057 | 10/1961 | France . |

*Primary Examiner*—Frank Sever
*Attorney, Agent, or Firm*—Brooks Haidt Haffner & Delahunty

[57] ABSTRACT

The invention relates to processes and apparatus for the elutriation of particles of a Ziegler-Natta type alpha-olefin polymerization catalyst, based on transition metal compound(s) and preferably also comprising magnesium compounds, by means of an elutriation liquid which is a non-polar liquid, for example a hydrocarbon chemically inert in relation to the catalyst. A preferred process comprises the following stages:

preparation of a homogeneous suspension of the catalyst in the elutriation liquid, and elutriation of the catalyst by means of the suspension and the elutriation liquid in one or two elutriation columns (F1),(F2), separating the large and fine catalyst particles respectively.

The apparatus comprises a tank (M2) for the preparation of the catalyst suspension and the elutriation column or columns (F1),(F2).

The invention also relates to elutriation of Ziegler-Natta catalyst particles using a non-polar elutriation liquid and wherein a special polar aprotic additive is employed, for example an organo-metallic compound.

6 Claims, 1 Drawing Sheet

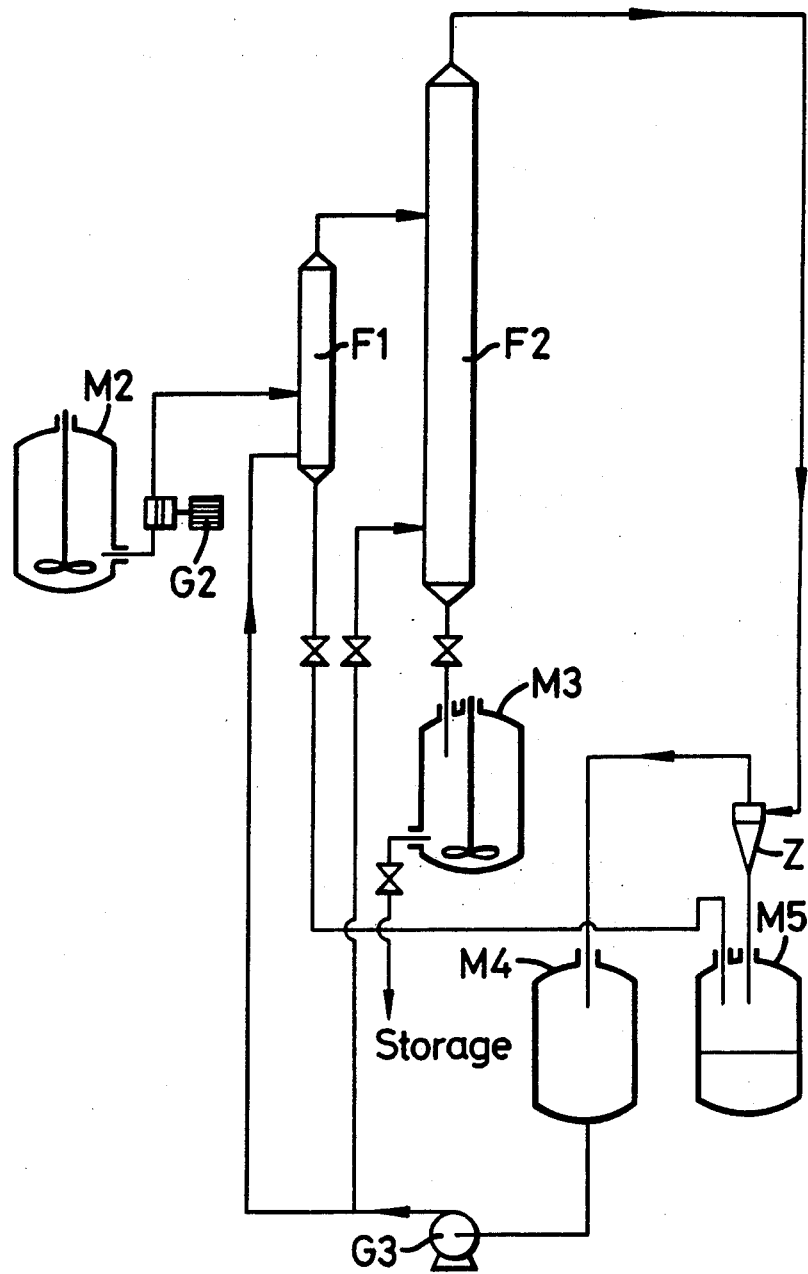

TREATMENT OF CATALYST PARTICLES

This application is a division of application Ser. No. 07/071,638 filed Jul. 9, 1987, now U.S. Pat. No. 4,818,417, which, in turn, is a division of Ser. No. 07/002,162 filed Jan. 12, 1987, now U.S. Pat. No. 4,714,553.

The present invention relates to the improvement of Ziegler-Natta type alpha-olefin polymerisation catalysts based on one or more transition metal compounds.

More particularly, the invention relates to processes and apparatus for the liquid elutriation of particles of alpha-olefin polymerisation catalyst, and makes it possible to obtain catalysts having a relatively narrow particle size distribution. These catalysts can be used in the polymerisation of alpha-olefins under low pressure to produce polyolefin powders themselves possessing a relatively narrow particle size distribution.

Ziegler-Natta catalyst systems comprise one or more transition metal compounds belonging to Groups IV, V or VI of the Periodic Table of Elements, and at least one organo-metallic compound of metals of Groups II or III of this Table. Generally, in the art of Ziegler-Natta polymerisation the transition metal-containing component of the catalyst system is referred to as the "catalyst", whilst the organometallic compound is referred to as the "co-catalyst". This terminology will be used in the present specification. The catalysts are frequently solid compounds consisting of titanium halides, preferably associated with compounds of magnesium, having a relatively high activity in the polymerisation of alpha-olefins, which advantageously makes it possible to avoid at the end of polymerisation the stage of removing the catalytic residues present in the polymers. The co-catalysts generally comprise organo-aluminium or organo-zinc compounds which are liquid or gaseous under the normal polymerisation conditions.

When the polymerisation of alpha-olefins is conducted in suspension in a liquid hydrocarbon medium, or in the gas phase, the solid polymer being formed develops inside and on each particle of catalyst. Provided that this development of polymer occurs in a uniform manner, the particle size distribution of the produced polymer particles remains similar to that of the catalyst, whilst the average particle size of the polymer particles increases as the reaction continues.

Highly active catalysts based on transition metal and magnesium compounds are generally prepared by contacting at least one transition metal compound with metallic magnesium or a magnesium compound, for example an organomagnesium compound, magnesium oxide, magnesium hydroxide, a magnesium alcoholate, magnesium hydroxychloride or magnesium chloride, such contacting being performed for example by chemical reaction, impregnation or grinding. The produced catalysts often have a comparatively broad particle size distribution associated with a high content of fine particles. This can cause problems in gas-fluidised bed polymerisation of olefins due to the fact that the fine particles are easily entrained by the fluidisation gas into parts of the apparatus not intended for carrying out on the polymerisation reaction.

Moreover the presence of fine particles of polyolefin, for example those possessing a diameter of less than 50 or 100 microns, provides a dust explosion risk during handling of the powders, can lead to losses of polyolefins during their conversion and can diminish the flowability of the polyolefin powders, thus hindering the feed to conversion machinery.

Large particles of polyolefin, for example those possessing a diameter up to several millimeters, provide difficulties in the pneumatic conveying of the powders.

It has been suggested that the fine and large catalyst particles should be removed by sieving or by elutriation using a flow of gas or liquid. However, having regard to the fineness of the catalyst particles, such a size segregation or "selection" operation has hitherto not been achieved under satisfactory industrial conditions.

In general, processes are known for segregating particles which use the physical principle of separating the particles by their differences in density. However, such processes cannot be applied to Ziegler-Natta type catalysts, whose particles are differentiated not by density, but by size.

Processes for segregating particles are also known which use the physical principle of separating particles by their differences in size. Such a segregation can be performed in an elutriation column in which an elutriation liquid flows in an ascending stream at a substantially constant speed and in laminar flow conditions—i.e., without turbulence. The segregation is performed by applying the physical principle of the variation in the speed at which the particles settle in the elutriation liquid in relation to their sizes. The largest particles settle towards the bottom of the column in relative contraflow with the elutriation liquid, while the finest particles are entrained to the top of the column with the elutriation liquid. Attempts to apply this type of elutriation technology to the segregation of Ziegler-Natta catalyst particles have encountered a number of difficulties, particularly due to the relatively low density of the catalyst particles, the relatively small average particle sizes involved and difficulties in relation to the selection of a suitable elutriation liquid. The elutriation liquid is desirably chemically inert in relation to the catalyst, and for practical reasons this restricts the choice of elutriation liquids essentially to non-polar liquids, for example, liquid hydrocarbons. However, it is found that the use of such non-polar liquids as elutriation liquids can cause aggregation or agglomeration of the catalyst particles making it difficult to achieve satisfactory particle segregation.

It is an object of the present invention to provide an improved process and apparatus for segregating Ziegler-Natta catalyst particles by liquid elutriation.

Accordingly the present invention provides a process for elutriation by a liquid of solid particles of a Ziegler-Natta catalyst to obtain separation into at least two portions which differ in average particle size characterised in that in a preliminary stage (stage 1) a suspension of the solid catalyst particles is prepared in the elutriation liquid which is a non-polar liquid chemically inert in relation to the catalyst, at a concentration in the range 20 to 150 grammes per liter, and further in that the process comprises one or more of the following defined stages M and N, Wherein stage M is a process for separating large particles comprising introducing the catalyst suspension at a flow rate Q1 into a vertical elutriation column F1 having a height H', at a level between H'/2 and the bottom of the column, introducing the elutriation liquid at a flow rate R1 into the column F1 at a level lower than that of the introduction of the catalyst suspension, the liquid being caused to flow in the column in an ascending stream substantially under laminar flow conditions, withdrawing from the top of the column F1 a catalyst suspension substantially free from large particles and, withdrawing from the bottom of the column F1 a catalyst suspension mainly comprising large particles and wherein stage N is a process for separating fine particles comprising introducing the catalyst suspension at a flow rate Q2 into a vertical elutriation column F2 of height H at a level above H/2 and below 7H/8, introducing the elutriation liquid at a flow rate R2 into the column F2 at a level below H/2, the liquid being caused to flow in the column in an ascending stream and substantially under conditions of laminar flow, withdrawing from the top of the column F2 elutriation liquid charged with fine catalyst particles and withdrawing from the bottom of the column F2 catalyst particles substantially freed from fine particles.

The laminar flow conditions mentioned in stages M and N above is characterised by a Reynolds number (Re) lower than 2000 and preferably lower than 1000. In the case of cylindrical columns of circular section the Reynolds number is dimensionless and equal to:

$$Re = \frac{4 \cdot Q \cdot n}{pi \cdot d \cdot v}$$

Where  $Q$ = flow rate of the liquid,
   $n$ = density of the liquid,
   $d$ = diameter of the column, and
   $v$ = viscosity of the liquid.

and pi is the universal constant 3.14159...

In the variants of the process according to the invention, therefore, the catalyst suspension in the elutriation liquid prepared during stage 1 can be subjected to an elutriation operation enabling either the large or fine particles of the catalyst to be separated. The suspension can also be subjected to a double elutriation operation enabling both the large and fine catalyst particles to be separated simultaneously, the large particles being separated in the elutriation column F1, preferably before the fine particles are separated in the elutriation column F2.

The catalyst suspension fed to the elutriation is preferably well dispersed and of substantially uniform constitution throughout.

The invention also relates to an apparatus for performing the elutriation process according to the invention and comprising:

a tank M2 for the preliminary preparation of a catalyst suspension in an elutriation liquid and having means adapted to maintain uniformity in the suspension, a vertical elutriation column F1 having a height H' and a diameter D' such that the ratio H'/D' is equal to or greater than 5, such column having: (a) a tube for the introduction of catalyst suspension prepared in the tank M2 or of the catalyst suspension substantially freed from fine particles coming from the outlet of the top of column F2 as the case may be, at a level lying between H'/2 and the bottom of the column; (b) a tube for the introduction of the elutriation liquid at a level lower than that of the introduction of the catalyst suspension; (c) an outlet from the top of the column for catalyst suspension substantially freed from large particles; and (d) an outlet from the bottom of the column for catalyst suspension comprising mainly large particles, and/or a vertical elutriation column F2 having a height H and a diameter D such that the ratio H/D is equal to or greater than 10, the column having: (a) a tube for the introduction of the catalyst suspension prepared in the tank M2 or of the catalyst suspension substantially freed from large particles coming from the outlet at the top of the column F1, as the case may be, such tube being disposed at a level above H/2 and below 7H/8; (b) a tube for the introduction of the elutriation liquid at a level lying below H/2; (c) an outlet from the top of the column for catalyst particles substantially freed from fine particles.

The apparatus can also advantageously comprise means for separating the catalyst particles and the elutriation liquid, for example, a decantation or filtration device, or a liquid cyclone, and also means for recycling the elutriation liquid freed from the catalyst particles to the feed to the column F1 and/or F2.

The invention is further illustrated with reference to the accompanying drawing.

FIG. 1 is a simplified diagram of a liquid-phase elutriator according to the invention, in which elutriation can be carried out on the one hand of the fine particles and on the other hand of the large particles present in powdery catalyst.

The process may be implemented in an apparatus such as that shown in FIG. 1 and operating in the following manner:

A uniform suspension is produced of the solid catalyst in the elutriation liquid. This suspension, maintained in agitation in the tank M2, is pumped by the pump G2 so as to feed the column F1 in which elimination of the large particles is carried out; these latter are then conveyed to the tank M5. The suspension freed from large particles and leaving column F1 at the top then feeds column F2. The columns F1 and F2 are fed with decanted elutriation liquid coming from the tank M4 by means of the pump G3.

The elutriation liquid leaving the column F2 at the top entrains the fine particles separated from the elutriation liquid by means of the hydrocyclone Z. The fine particles separated are introduced into the tank M5 where decanting of the separated particles is performed, whilst the elutriation liquid separated in the hydrocyclone Z is sent to the tank M4.

The elutriated catalyst leaves the column F2 at the bottom. It is collected in the tank M3 in the form of a concentrated suspension.

In order to obtain good particle size separation of the fine particles and/or large particles in the catalyst the following provisions are preferred:

the ratio between the height H' and the diameter D' of the elutriation column F1 is equal to or greater than 5, preferably equal to or greater than 10;

the ratio between the height H and the diameter D of the elutriation column F2 is equal to or greater than 10, preferably about 20;

the point at which the catalyst suspension is introduced into the elutriation columns F1 and F2 has an influence on the quality of separation; if H is the height of the elutriation column F2 adapted to separate the fine particles, the catalyst suspension is advantageously introduced above H/2, preferably at 3H/4 or above, and below 7H/8;

moreover, in the case of the elutriation column F1 adapted to separate the large particles and having a height H', the catalyst suspension is preferably fed at a level lying between H'/2 and the bottom of the column, preferably lying between H'/4 and the bottom of the column;

also advantageously the elutriation liquid is introduced into the columns F1 and F2 at a point lying below the point where the catalyst suspension is introduced, preferably at a point such that the distance separating the points of introduction of the elutriation liquid and the catalyst suspension is equal to or greater than H'/8, preferably equal to or greater than H'/4 in the column F1, and equal to or greater than H/4, preferably equal to or greater than H/2 in the column F2, since it has been found that a sufficiently large distance separating the two points of introduction into a column enables the dispersion of the particles in the elutriation liquid to be improved and therefore improves the quality of the selection; the introduction of the elutriation liquid into the column F1 is therefore performed at a level lying preferably below H'/4; similarly, the elutriation liquid is advantageously introduced into the column F2 at a level preferably lying at H/4 or there below;

the concentration of the catalyst suspension in the elutriation liquid prepared in the tank M2 must be relatively low, lying more particularly between 20 and 150 g/l, and preferably between 40 and 100 g/l; such a concentration enables the quality of the particle size selection to be improved and the elutriated catalyst yield to be enhanced;

the catalyst concentration in the elutriation columns is advantageously low; more particularly, in the column F1 it lies between 10 and 100 g/l, preferably between 30 and 70 g/l, while in column F2 it lies between 2 and 60 g/l, preferably between 5 and 30 g/l; in these conditions the large and fine catalyst particles can be efficiently separated and then readily eliminated; the ratio between the flow rates R1/Q1 in the column F1 therefore advantageously lies between 0.2 and 5, preferably between 0.5 and 2; similarly, the ratio between the flow rates R2/Q2 in the column F2 is advantageously between 0.3 and 6, preferably between 0.5 and 4;

the liquid used for elutriation must not impair the catalysts; preferably it is a dry liquid aliphatic hydrocarbon freed from oxygen, for example, n-heptane or n-hexane.

The process according to the invention can be performed by continuous introduction of the catalyst suspension and elutriation liquid into the elutriation column or columns (permanent continuous conditions), or by continuous introduction for a predetermined period of the catalyst suspension into the elutriation column or columns and continuous introduction of the elutriation liquid until the whole of the catalyst charge has been elutriated (non-permanent continuous conditions).

Depending on the catalysts, one proceeds to a simple selection (fine or large) or to a double particle size selection (fine and large), each type of selection involving the elutriation characteristics peculiar to it (dimension of columns, throughput of solvent). These characteristics are determined experimentally within the limits disclosed hereinbefore.

It has been observed that the particle selection is improved when the elutriation is conducted in the presence of a small quantity of one or more special additives.

Accordingly, the present invention further comprises a process for elutriation of particles of a Ziegler Natta-type catalyst comprising performing the elutriation using a non-polar liquid elutriation medium in the presence of a polar aprotic compound, preferably an organometallic compound. The Ziegler Natta-type catalyst comprises a compound or compounds of one or more transition metals selected from metals of Groups IV, V or VI of the Periodic Table (Mendeleer). The Ziegler Natta-type catalyst preferably comprises one or more transition metal compounds associated with or in chemical combination with one or more magnesium compounds. The preferred polar aprotic compounds are soluble in the elutriation liquid. Most preferably they are organo-metallic compounds of the type used as co-catalysts in Ziegler-Natta catalyst systems; these co-catalysts generally consist of organo-metallic compounds of metals belonging to Groups II or III of the Periodic Table, especially of organoaluminium, organozinc or organomagnesium compounds comprising at least one aluminium/carbon bond, such as trialkylaluminiums, halides or alcoholates of alkylaluminium, dialkylzinc and dialkylmagnesium. Preferred compounds are triethylaluminium, triisobutylaluminium, tri-n-hexylaluminium, tri-n-octylaluminium, diethylaluminium chloride, ethylaluminium sesquichloride, ethoxydiethylaluminium or diethylzinc. These compounds are preferably used at concentrations in the range 0.1 and 100 millimoles per liter of elutriation liquid.

The polar aprotic compound employed as the special additive in the process of the present invention is preferably selected from compounds which do not deleteriously affect the catalyst. In the case that the additive is an organometallic compound, some reduction and/or activation of the catalyst particles can take place. The use of the defined polar aprotic compounds can lead to improvements in the quality of the particle size selection, the yield of elutriated catalyst and the reproducibility of the operations.

The catalysts employed in the processes of the invention preferably consist essentially of halogenated compounds of transition metals belonging to Groups IV, V or VI of the Periodic Table of Elements and compounds of magnesium and optionally with aluminium compounds. Preferred catalysts have the general formula:

$Mg_mAl_nM(OR_l)_pX_qD_r$ in which M is an atom of titanium and/or vanadium, $R_l$ is an alkyl group comprising 2 to 14 carbon atoms, X is an atom of chlorine and/or bromine, D is an electron donor compound comprising at least one atom of oxygen, or sulphur, or nitrogen, or phosphorus, but not comprising an atom of active hydrogen, wherein;

| | |
|---|---|
| m | lies in the range 1.5 to 50, preferably 2 to 10, |
| n | lies in the range 0 to 2, preferably 0 to 1, |
| p | lies in the range 0 to 3, |
| q | lies in the range 4 to 100, preferably 5 to 27, and |
| r | lies in the range 0 to 60, preferably 0 to 20. |

These catalysts can be obtained by various processes in themselves known, in particular those according to which a magnesium compound, for example a magnesium halide, is ground in the presence of at least one halogenated compound of a transition metal and optionally an electron donor compound, or else a magnesium compound is precipitated at the same time as one or more halogenated transition metal compounds, optionally in the presence of an electron donor compound.

The catalysts can be obtained, for example, by reacting an organomagnesium compound with a halogenated transition metal compound taken at its maximum valency in the presence of a halogenating agent and optionally an electron donor compound D, having the same definition as above, chosen for example from amongst amines, amides, phosphines, sulphoxides, sulphones, ethers and thio-ethers. This reaction is advantageously performed using these compounds in quantities such that the molar ratio of the quantity of organomagnesium compound to the quantity of halogenated transition metal compound is greater than 1, the excess of organomagnesium compound being decomposed by the halogenating agent so that no substantial quantity of magnesium-carbon bonds remains.

The catalysts may also be obtained by reacting magnesium metal with an alkyl halide in the presence of a halogenated transition metal compound taken at its maximum valency and optionally an electron donor compound D having the same definition as above. This reaction is advantageously performed using a quantity of magnesium metal such the molar ratio of the quantity of magnesium metal to the quantity of halogenated transition metal compound is greater than 1, and a quantity of alkyl halide such that after the reaction substantial quantities of compounds comprising a magnesium-carbon bond are no longer present.

The processes of the present invention are particularly useful for size separation by liquid elutriation of Ziegler-Natta catalyst particles having a density in the range 1 to 2, preferably in the range 1.2 to 1.6, and having an average particle size in the range 10 to 100 microns. Such particles can have irregular shapes and rough surfaces.

The catalysts obtained by elutriation according to the present invention can be used in processes of polymerisation or copolymerisation of alpha-olefins, especially in gas-phase polymerisation or copolymerisation processes, and in particular in a fluidised bed.

The invention is illustrated by the following examples, in which Example 1 is given by way of comparison:

EXAMPLE 1

(Comparison)

(a) Preparation of the catalyst

A 1-liter glass reactor, provided with a mechanical stirrer, a reflux condenser and a heating or cooling device is filled with dry nitrogen; there are introduced into it successively at ambient temperature:

12.15 g (500 m.Moles) of magnesium in powder form
23.75 g (125 m.Moles) of titanium tetrachloride
92.5 g (1 Mole) of n-butyl chloride
n-heptane, to make up the volume to 600 ml.

After the addition of 1.26 g of iodine, the reaction medium is heated with stirring to 75° C., so as to cause the reaction to commence. The reaction begins slowly after about an hour and a half and the reaction medium is maintained at 75° C. for 3.5 hours. The resultant brown/black precipitate is washed several times with heptane. The catalyst A obtained has the following composition by weight:

| Ti: 10.3% | Mg: 19.2% | Cl: 70.5% |
| --- | --- | --- |

(b) Polymerisation of ethylene

Into a 5-liter stainless steel reactor provided with mechanical stirring there are introduced under an atmosphere of nitrogen 2 liters of n-heptane at ambient temperature. After heating the n-heptane to 70° C., one introduces:

0.46 g (4 m.Moles) of triethylaluminium
a quantity of catalyst corresponding to 1 milligram atom of titanium.

When the reaction medium has been heated to 75° C., hydrogen is introduced into it until a pressure of 0.6 MPa is obtained, then ethylene at a throughput of 160 g/hr.

After 7 hours of polymerisation, 1100 g of polymer are collected, the titanium content of which is 34 parts per million by weight (ppm).

The particle size distribution of the polymer is shown in Table 1.

EXAMPLE 2

(a) Preparation of the elutriated catalyst

1Kg of the catalyst A is prepared using the same conditions as in Example 1(a). The catalyst is subjected to liquid elutriation using the following conditions:

| apparatus | as shown in FIG. 1, but omitting the column (F1) |
| --- | --- |
| diameter of the column (F2) | 70 mm |
| height of the column (F2) | 1600 mm |
| elutriation operation | continuous non-permanent |
| nature of elutriation liquid | n-heptane |
| level of introduction of the elutriation liquid into the column | 150 mm above the bottom |
| throughput of elutriation liquid (R2) | 15 liters per hour |
| catalyst concentration in the catalyst suspension | 100 millimoles of titanium/liter - i.e 60 g of catalyst per liter |
| throughput of catalyst suspension (Q2) | 4 liters per hour |
| catalyst concentration in the column (F2) | 13 millimoles of titanium per liter - i.e. 7.8 g of catalyst per liter |
| level of introduction of the catalyst suspension into the column (F2) | 1200 mm above the bottom |
| yield of elutriated catalyst (based on titanium contained in the catalyst) | 50% |
| hourly production | 0.2 millimoles of titanium/hour - i.e. 0.12 Kg of catalyst per hour. |

The catalyst B obtained after elutriation has the same chemical characteristics as catalyst A.

(b) Polymerisation

Example 1(b) was repeated using catalyst B instead of catalyst A.

1100 g of a polyethylene powder are obtained, the particle size distribution of which is shown in Table 1.

It is found that the polyethylene obtained from catalyst B has a content of particles with dimensions below 350 microns which is appreciably lower than that of the polyethylene obtained from catalyst A, this decrease being particularly significant for particles with dimensions below 50 microns.

EXAMPLE 3

(a) Preparation of the elutriated catalyst

1 Kg of catalyst prepared in accordance with Example 1(a) is subjected to liquid elutriation under the following conditions:

| apparatus | as shown in FIG. 1, omitting column (F1) |
| --- | --- |

-continued

| | |
|---|---|
| diameter of column (F2) | 70 mm |
| height of column (F2) | 1600 mm |
| elutriation operation | continuous non-permanent |
| nature of elutriation liquid | n-heptane |
| height of introduction of the elutriation liquid into the column (F2) | 150 mm above the bottom |
| throughput of elutriation liquid (R2) | 15 liters/hour |
| nature of additive contained in the elutriation liquid | tri-n-octylaluminium |
| additive concentration in the elutriation liquid | 0.7 millimole/liter |
| catalyst concentration in the catalyst suspension | 100 millimoles of titanium/liter - i.e. 60 g of catalyst per liter |
| throughput of catalyst suspension (Q2) | 4 liters/hour |
| catalyst concentration in the column (F2) | 17 millimoles of titanium/liter - i.e. 10.4 g of catalyst per liter |
| level of introduction of the catalyst suspension into the column (F2) | 1200 mm above the bottom |
| yield of elutriated catalyst (based on titanium contained in the catalyst) | 65% |
| hourly production | 0.26 millimoles of titanium per hour - i.e. 0.16 Kg of catalyst per hour |

The catalyst C obtained after elutration has the same chemical characteristics as catalyst A.

(b) Polymerisation

Example 1(b) is repeated using catalyst C instead of the catalyst A.

1100 g of a polyethylene powder are obtained, the particle size distribution of which is shown in Table I.

It is found that the polyethylene obtained from catalyst C has a content of particles with dimensions below 350 microns which is appreciably smaller than that of the polyethylene obtained from catalysts A and B, this decrease being particularly great for particles of dimensions below 50 microns.

It is also noted that the yield of catalyst C is appreciably higher than the yield of catalyst B obtained in Example 2.

EXAMPLE 4

In order to determine the reproducibility of the elutriation operations described in Examples 2 and 3, each of these examples is reproduced 10 times from the same catalyst A, and one determines:

the mean percentage by weight of particles of polyethylene with dimensions below 160 microns and the corresponding standard deviation, the mean yield of elutriated catalyst and the corresponding standard deviation.

The results obtained are set out in Table II.

The standard deviation, $$\sqrt{\Sigma \text{ (deviation)}^2},$$

that is to say the square root of the sum of the squares of the deviations by comparison with the mean result, gives an indication of the dispersion of the results obtained and consequently of the reproducibility of the tests.

It is found that the standard deviations obtained according to Example 3 are smaller than those obtained in Example 2, both as regards the percentage of particles with dimensions below 160 microns and the catalyst yield, which indicates that the conditions of Example 3 provide appreciably more reproducible results than those of Example 2.

TABLE I

COMPARISON OF THE PARTICLE SIZES OF THE POLYETHYLENE OBTAINED WITH THE NON-ELUTRIATED CATALYST (CATALYST A) AND THE POLYETHYLENE OBTAINED WITH THE ELUTRIATED CATALYST (CATALYSTS B AND C)

| | Aperature of sieves (microns) | above 1000 | 710–1000 | 500–710 | 350–500 | 250–350 | 160–250 | 125–160 | 80–125 | 50–80 | below 50 |
|---|---|---|---|---|---|---|---|---|---|---|---|
| Percentage by weight of particles retained between two sieves | Catalyst A | 1 | 7 | 16 | 23 | 21 | 16 | 5 | 6.5 | 2.5 | 2 |
| | Catalyst B | 2 | 10 | 24 | 26 | 17 | 12 | 3.5 | 4 | 1 | 0.5 |
| | Catalyst C | 3 | 15 | 24 | 26 | 16 | 10.5 | 2 | 2.5 | 1 | 0 |

TABLE II

| | Example 2, reproduced 10 times | | Example 3, reproduced 10 times | |
|---|---|---|---|---|
| | % by weight of particles with dimensions below 160 microns | Catalyst Yield | % by weight particles with dimensions below 160 microns | Catalyst Yield |
| Mean Result | 9 | 50 | 5.5 | 65 |
| Typical deviation | 3 | 10 | 1.5 | 5 |

I claim:

1. A process for the elutriation of particles of a Ziegler-Natta type catalyst into at least two portions which differ in average particle size wherein the improvement comprises performing the elutriation using a non-polar liquid elutriation medium in the presence of a polar aprotic compound in kinds and concentrations sufficient to enable significant separation of the fine particles from the large particles.

2. A process as claimed in claim 1 wherein the polar aprotic compound is an organo-metallic compound.

3. A process as claimed in claim 1 wherein the polar aprotic compound is an organoaluminium, organozinc or organomagnesium compound.

4. A process as claimed in claim 1 wherein the polar aprotic compound is employed at a concentration of 0.1 to 100 millimoles per liter of elutriation liquid.

5. A process as claimed in claim 1 wherein the Ziegler Natta-type catalyst comprises one or more transition metal compounds associated with or in chemical combination with one or more magnesium compounds.

6. A process for separating particles of a Ziegler-Natta type catalyst into at least two portions which differ in average particle size which comprises introducing solid Ziegler-Natta type catalyst particles into an elutriation apparatus containing an inert non-polar elutriation liquid in the presence of a polar aprotic compound, obtaining at least two portions of said Ziegler-Natta type catalyst particles which differ in average particle size, the portion having a larger particle size being obtained at one point in the apparatus and obtaining the portion having a smaller particle size at another point in the apparatus, the kinds and concentrations of non-polar elutriation liquid and polar aprotic compound being sufficient to enable significant separation of the fine particles from the large particles.

* * * * *